May 20, 1952          H. KONET          2,597,151
COMPENSATED VERTICAL GYROSCOPE SYSTEM
Filed June 10, 1949          2 SHEETS—SHEET 1
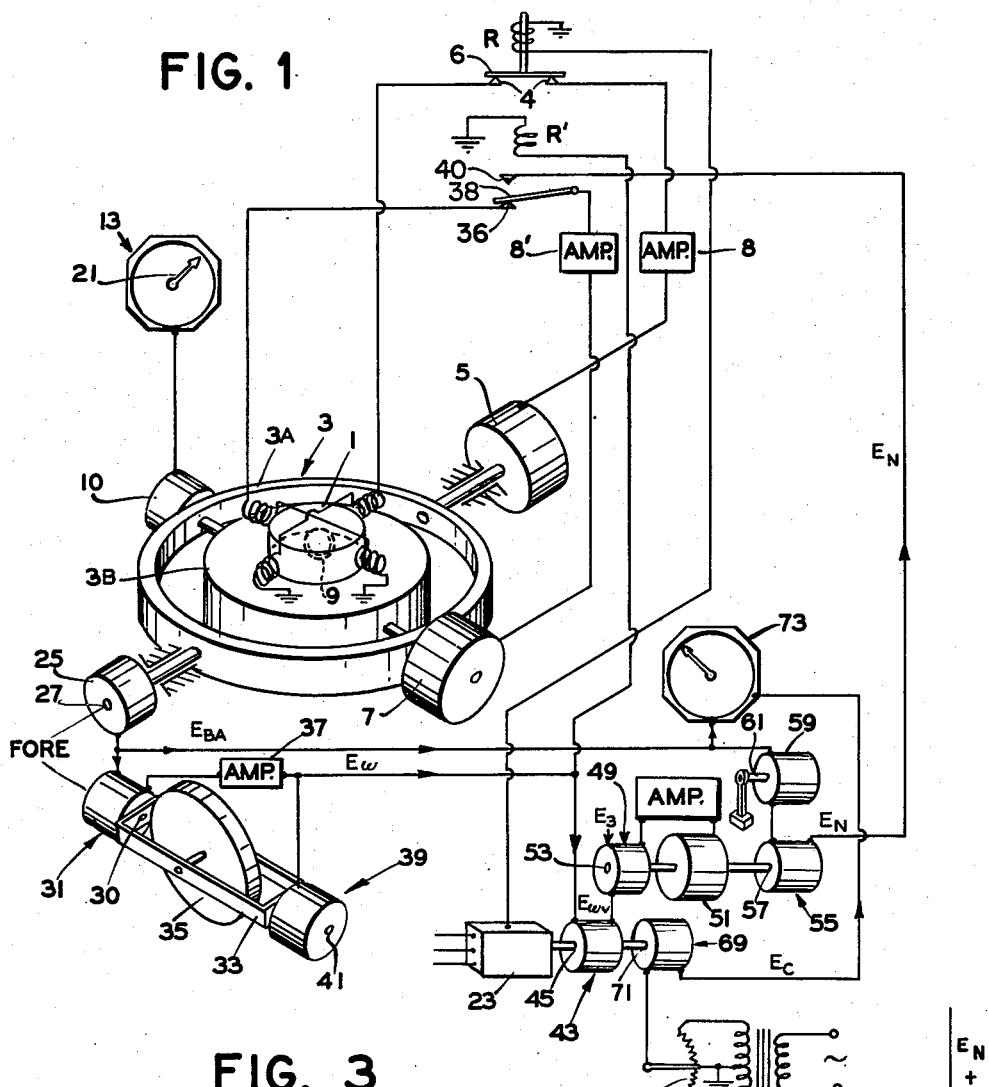
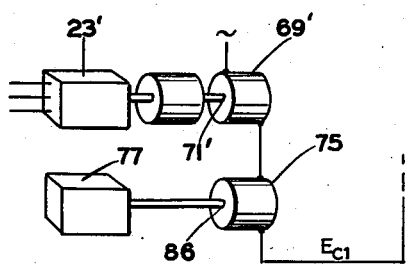
INVENTOR.
HENRY KONET
BY
*Sylvester Hartz*
ATTORNEY Patented May 20, 1952

2,597,151

UNITED STATES PATENT OFFICE 2,597,151

COMPENSATED VERTICAL GYROSCOPE SYSTEM

Henry Konet, Hohokus, N. J., assignor to Bendix Aviation Corporation, Teterboro, N. J., a corporation of Delaware Application June 10, 1949, Serial No. 98,350

12 Claims. (Cl. 33—204)

The invention relates to a gyroscope for use on a moving craft, and more particularly to a vertically precessed gyroscope system which provides an accurate reference for the vertical.

A free gyroscope tends to remain fixed in space, and its spin axis remains parallel to its original position as the gyroscope support is moved in space by the earth's rotation and by motion of the craft mounting the gyroscope relative to the earth. Also, frictional, unbalancing, and other disturbing forces cause movement of the gyroscope axis and result in errors in gyroscope position. Thus, the axis of the gyroscope appears to drift from the vertical. To maintain the gyroscope spin axis vertical, precessing forces must be applied to the gyroscope by an erecting device to compensate for the apparent drift from the vertical.

The erecting device may include a mass acting as a pendulum, but the mass is subjected to acceleration forces resulting from angular acceleration due to turning of the craft, linear acceleration due to changes in velocity of the craft, and Coriolis acceleration due to the combined effect of the earth's rotation and the craft's relative motion. These acceleration forces cause the erecting device to erroneously precess the gyroscope. The terms "pitch axis" and "bank axis" of the gyroscope are used hereinafter in the specification and claims to indicate mutually perpendicular axes parallel to or coincident with the pitch axis and the bank axis of the craft and about which the gyroscope moves angularly.

The main object of the present invention is to provide a precessed gyroscope system which provides an accurate reference for the vertical.

Another object is to eliminate errors due to linear acceleration by operating the gyroscope about its pitch axis as a free gyroscope momentarily when the linear velocity of the craft changes appreciably.

Another object is to provide an erecting device which maintains the gyroscope axes vertical by compensating for errors due to angular acceleration.

Another object is to provide an attitude indicator which corrects errors due to Coriolis acceleration.

The invention contemplates nullifying the effect of the pendulous mass on the pitch and bank precessing means when the craft changes speed and direction, respectively, and permitting the gyroscope to act as a free gyroscope about its pitch axis and substituting bank erecting information for the gyroscope from the velocity and the rate of turn of the craft.

The invention also contemplates an indicator which is corrected for Coriolis error as a function of data from the velocity of the craft and latitude.

The attainment of the above and other objects will be apparent to those skilled in the art from the following description and accompanying drawings, in which Figure 1 is a diagram of a vertical seeking gyroscope system constructed according to the invention.

Figures 3 and 4 show modifications of portions of the arrangement shown in Figure 1.

Figure 2:
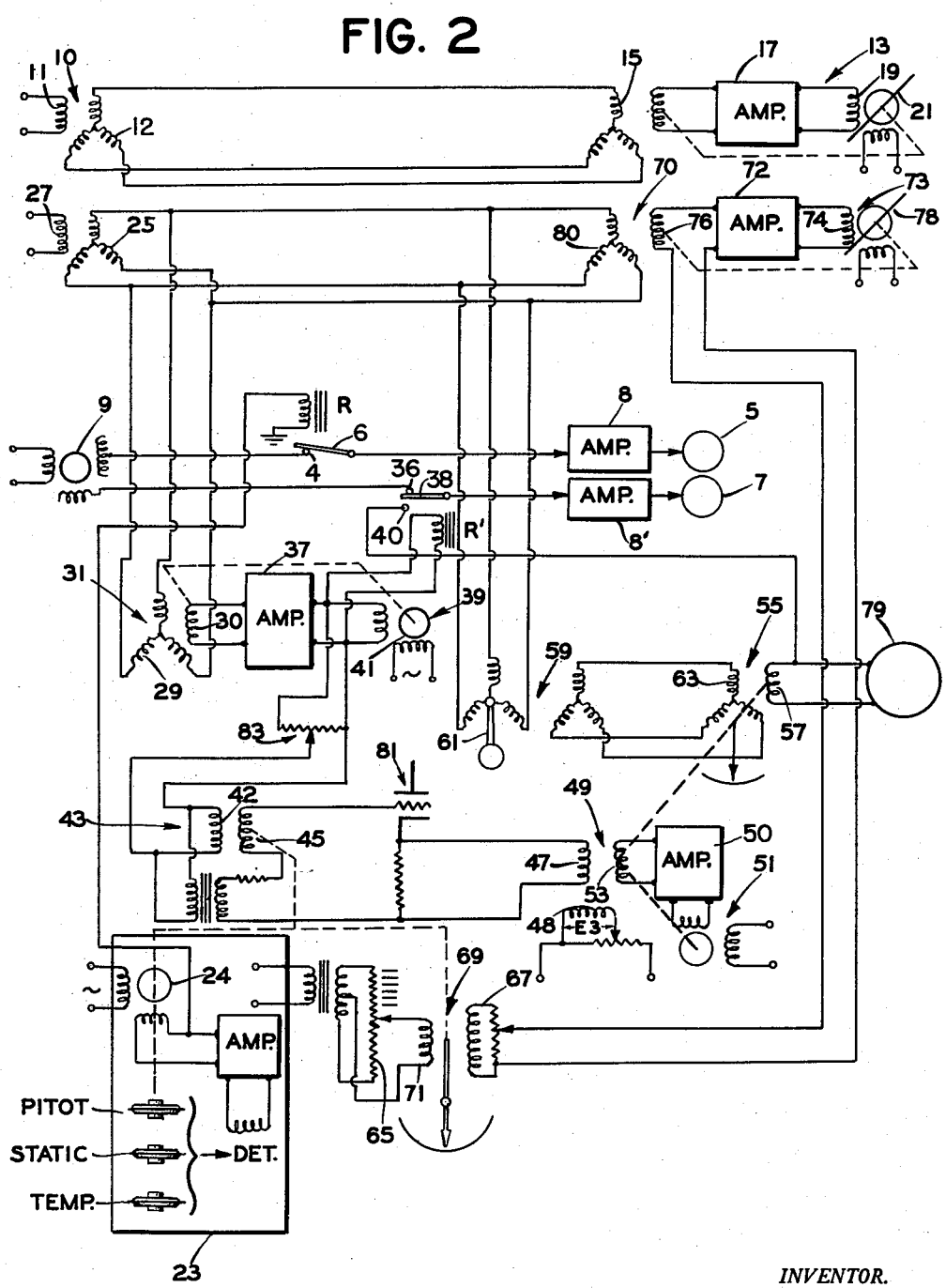
Figure 2 is a schematic wiring diagram showing the electrical connections of the various elements shown in Figure 1.

A vertical gyroscope 1 is mounted in a support 3 including gimbals 3a, 3b, movable angularly about mutually perpendicular horizontal axes. An erector system precesses the gyroscope axis to the vertical and includes a pitch precessing motor 5 with its axis extending fore and aft of the craft on which the gyroscope is mounted, that is, on the gyroscope's bank axis, and a bank precessing motor 7 with its axis extending transversely of the craft, that is, on the gyroscope's pitch axis.

In level, unaccelerated flight, with the craft's angular velocity less than a predetermined minimum, a ball pendulum device 9 sensitive to pitch and bank of the gyroscope is connected through the normally closed contacts 4, 6 and 36, 38 of relays R and R' and amplifiers 8 and 8' to motors 5 and 7, respectively, and controls the motors to precess the gyroscope axis to the vertical. The ball pendulum device may be of the kind described in co-pending application Serial No. 5,314, filed January 30, 1948, now Patent No. 2,553,268, by Paul A. Noxon and John A. Mead, and assigned to the same assignee as the present application.

A pitch inductive device, such as a synchro 10 is coaxial with the gyroscope's pitch axis, and has its rotor 11 mechanically connected to gimbal 3b and its stator 12 mechanically connected to gimbal 3a. A pitch repeater 13 is connected electrically to pitch synchro 10 and includes a receiving synchro 15, an amplifier 17, a servomotor 19 to drive the rotor of the synchro to null position, and a pitch angle indicator 21. Pitch synchro 10 produces a voltage which is a function of the angle of tilt of the gyroscope about its pitch axis relative to the craft and controls pitch repeater 13.

When the air speed of the craft changes appreciably, due to linear acceleration or deceleration of the craft, a true air speed and acceleration computer 23 produces an acceleration voltage which operates relay R and opens contacts 4, 6 to disconnect motor 5 from ball pendulum device 9, so that the gyroscope operates about its pitch axis as a free gyroscope while the craft changes speed. The computer is responsive to pitot and static pressure data and temperature data and provides an index of true air speed which is detected and amplified to drive a motor 24 and produce the voltage for energizing relay R. Instead of using a true air speed computer and a relay, any other means sensitive to change in speed of the craft may be used to disconnect the pitch precessing motor from the pitch sensing means during speed changes.

A bank inductive device, such as a synchro 25 is coaxial with the gyroscope's bank axis and has its rotor 27 mechanically connected to gimbal 3a and its stator rigid with the craft. The bank synchro produces a signal voltage $E_{BA}$ which is a function of the angle of tilt of the gyroscope about its bank axis relative to the craft.

The relationship between the dynamic and true verticals when the craft is turning is an angle $B=\tan^{-1}K\omega V$, where B is the angle between the dynamic and true verticals, $\omega$ is the angular velocity of the craft about a vertical axis, V is the ground speed and K is a constant of proportionality. True air speed is used in the computations instead of ground speed because the true air speed is easily available from conventional instruments. Any error introduced into the system because of the difference between true air speed and ground speed is negligible for the speeds of craft in which the system is especially adapted for use—that is, speeds preferably in excess of 700 miles per hour. When the rate of turn is appreciable, data corresponding to the theoretical angle between the dynamic and true verticals is impressed on bank precessing motor 7 instead of the output of ball pendulum device 9.

To govern precession of the vertical gyroscope in bank when the craft rate of turn is appreciable, the voltage $E_{BA}$ is impressed on the stator 29 of a synchro 31. The rotor 30 of synchro 31 is mechanically connected to a frame 33 mounting a turn rate gyroscope 35 spinning about a horizontal axis extending transversely of the craft. The output voltage of the rotor 30 of synchro 31 is amplified at 37 and the amplified voltage $E\omega$ controls a servomotor 39 having its rotor 41 mechanically connected to frame 33 of turn rate gyroscope 35. Motor 39 opposes angular displacement of the axis of turn rate gyroscope 35 from a horizontal plane. The voltage $E\omega$ also energizes relay R' to open contacts 36, 38 and disconnect bank precessing motor 7 from ball pendulum device 9, when the turn rate of the craft is excessive, and close contacts 38, 40 of relay R' for the reason mentioned hereinafter.

The voltage $E\omega$ is also impressed on the stator 42 of a variable transformer 43, having its rotor 45 mechanically connected to true air speed and acceleration computer 23. The angle through which rotor 45 of variable transformer 43 rotates is proportional to the air speed of the craft. Rotor 45 is connected electrically to the stator 47 of a resolver 49. The function of variable transformer 43 is to multiply the voltage $E\omega$ by V (the velocity of the craft) to produce an output voltage $E\omega V$ which is proportional to the rate of turn of the craft and to its velocity. The voltage $E\omega V$ is fed to the stator 47 and a reference voltage $E_3$ is fed to the stator 48 of resolver 49. The resolved voltages from rotor 53 of resolver 49 are amplified at 50 and the resolved amplified voltage is impressed on a motor 51 which drives the rotor 53 of resolver 49 to null position through an angle $B=\tan^{-1}K\omega V$. A synchro 55 has its rotor 57 connected mechanically to the rotor 53 of resolver 49.

The voltage $E_{BA}$ from synchro 25 also is fed to a differential synchro 59, whose rotor 61 is pendulous. The output of synchro 59 provides electrical signals which are functions of the angle between the true vertical and the dynamic vertical, thereby eliminating any error due to improper banking. The signal from synchro 59 is fed to the stator 63 of synchro 55 and the output voltage $E_N$ from the rotor 57 of synchro 55 is proportional to the difference in the angle between the true vertical and the dynamic vertical as indicated by the gyroscope axis and as computed. The voltage $E_N$ is applied to amplifier 8' through contacts 40, 38 of relay R' and the amplified voltage is impressed on motor 7 to precess the vertical gyroscope about its bank axis. The amplified voltage $E_N$ may be impressed on motor 7 at all times instead of the output voltage of pendulous device 9. Such arrangement would eliminate the use of relay R'.

The Coriolic acceleration affects the axis of the gyroscope in bank when the craft is moving relative to the earth. The Coriolis acceleration error is proportional to $V \sin \lambda$, where V is the velocity and $\lambda$ is the angle of latitude of the earth at which the craft is moving.

A potentiometer 65 includes a suitable scale arranged so that the potentiometer may be set manually in proportion to $\sin \lambda$ and produce a proportional voltage $E \sin \lambda$, which is fed to the rotor 71 of a variable transformer 69. The rotor 71 of variable transformer 69 is connected mechanically to computer 23, and is moved thereby through an angle proportional to the air speed of the craft. The output voltage $E_C$ of the stator 67 of variable transformer 69 is proportional to $V \sin \lambda$ which is proportional to the Coriolis acceleration error, as described above.

A bank repeater 73 is similar to pitch repeater 13 and includes a receiving synchro 70, an amplifier 72, a servomotor 74 to drive the rotor 76 of the synchro to null position and a bank angle indicator 78. The voltage $E_{BA}$ of synchro 25 is impressed on the stator 80 of repeater synchro 70 and the voltage $E_C$ of variable transformer 69 is impressed on the rotor 76 of repeater synchro 70, and the combined voltages control bank repeater indicator 78. Thus, the reading of bank repeater 73 is corrected for the error due to Coriolis acceleration.

Instead of impressing the voltage $E_C$ on repeater 73, the voltage $E_C$ may be algebraically combined with voltage $E_N$ from synchro 55, as shown in Figure 4, and the resultant may be fed to the bank precessing motor 7. With this arrangement, the axis of the gyroscope will automatically be corrected for the Coriolis acceleration error.

It is evident that the signal indicated by meter 79 is the measure of the discrepancy between a vertical datum established by subtracting the computed pendulum deflection due to turn from the actual pendulum position, on the one hand, and the vertical datum provided by the axis of the gyro, on the other hand, and hence meter 79 facilities the initial setting of the means yielding this signal. Also, a cathode follower 81 is provided for eliminating the effect on variable transformer 43 of load due to resolver 49. A potentiometer 83 is associated with variable transformer 43 for adjusting the voltage Eω to a suitable value for multiplication by the speed of the craft.

In the modification shown in Figure 3, the output of air speed and acceleration computer 23' controls the angle of rotation of the rotor 71' of a variable transformer 69', and the voltage produced by the variable transformer is proportional to the speed of the craft substantially as described above. The voltage from variable transformer 69' may be applied to a variable transformer 75 having its rotor 86 rotated either manually or automatically by an air position indicator or ground position indicator computer 77 through an angle λ to give a resultant voltage $E_{C1}$ proportional to $V \sin \lambda$. The voltage $E_{C1}$ and voltage $E_{BA}$ from bank synchro 25 control bank repeater 73 substantially as described above.

The system described eliminates linear acceleration errors by electrically disconnecting pendulous pitch sensitive device 9 from the pitch precessing motor 5, so that the vertical gyroscope operates in pitch momentarily as a free gyroscope while the craft is changing speed.

The device substantially eliminates turn error in controlling bank precessing motor 7 by a voltage proportional to the difference in the angle between the dynamic and true verticals as indicated by the gyroscope axis and as computed.

The device corrects for Coriolis acceleration error by modifying the input to bank repeater 73 or bank precessing motor 7 proportional to the relation $V \sin \lambda$.

Although but one embodiment of the invention has been illustrated and described in detail, it is to be expressly understood that the invention is not limited thereto. Various changes can be made without departing from the spirit and scope of the invention as the same will now be apparent to those skilled in the art. For example, if desired, potentiometers or other suitable means may be used as equivalents of variable transformers.

For a definition of the limits of the invention, reference will be had primarily to the appended claims.

What is claimed is:

1. In a gyroscope system for use on a moving craft, a gyroscope, a support mounting said gyroscope for angular movement about its bank axis, pendulous means for precessing said support about said axis, means responsive to rate of turn of the craft to render inoperative said pendulous means on said support when the craft changes direction, and means to apply precessional forces to the gyroscope support determined by angular and linear velocities of the craft and bank of the craft to maintain the spin axis of the gyroscope in a predetermined attitude while the craft changes its direction.

2. In a gyroscope system for use on a moving craft, a gyroscope, a support mounting said gyroscope for angular movement about mutually perpendicular axes, pendulous means for precessing the gyroscope support about each of said mutually perpendicular axes, means responsive to change in linear velocity of the craft to render inoperative said pendulous means on said support about one of said mutually perpendicular axes when the craft changes velocity, means responsive to rate of turn of the craft to render inoperative said pendulous means on said support about the other of its mutually perpendicular axes when the craft changes direction, and means to precess the gyroscope support about said last-mentioned axis in response to angular and linear velocities of the craft and bank of the craft to maintain the spin axis of the gyroscope vertical while the craft changes direction.

3. In a gyroscope system for use on a moving craft, a gyroscope, a support mounting said gyroscope for angular movement about its pitch and bank axes, a device for precessing the gyroscope support about the gyroscope bank axis, means responsive to relative movement of the craft and the support about the gyroscope bank axis and producing a signal which is a function of the angle of tilt of the craft relative to the gyroscope, a turn rate gyroscope arrangement acting upon the signal and modifying the signal in proportion to the angular velocity of the craft about a vertical axis, a computer responsive to the linear velocity of the craft and acting upon the modified signal to produce a signal in proportion to the angular and linear velocities of the craft, a pendulous synchro receiving and correcting the first-mentioned signal for improper bank of the craft, and means to add algebraically the resulting signal and the signal proportional to the angular and linear velocities of the craft, the signal sum being impressed on said device to apply precessional forces to the gyroscope support.

4. In a gyroscope system for use on a moving craft, a gyroscope, a support mounting said gyroscope for angular movement about its pitch and bank axes, a pendulous device, motors for precessing the gyroscope support about said axes and responsive to said device, a synchro responsive to movement of the craft relative to the support about its bank axis and producing a signal which is a function of the angle of tilt of the craft relative to the gyroscope, a turn rate gyroscope including a synchro and a servomotor opposing angular displacement of the turn rate gyroscope axis, said turn rate gyroscope synchro receiving and modifying the signal in proportion to the angular velocity of the craft about a vertical axis, an air speed computer adapted to produce a signal proportional to the linear velocity of the craft, a differential transformer to combine the turn rate gyroscope signal and the computer signal to produce a resultant which is a function of the angular and linear velocities of the craft, a pendulous synchro adapted to receive said first-mentioned signal and to correct the signal for errors in bank of the craft, and means combining said resultant and the signal corrected for errors in bank, said means being connected electrically to the bank precessing motor for impressing the result thereon.

5. In combination, a vertical seeking gyroscope, a device for automatically determining the Coriolis error between the true vertical and the apparent vertical of the craft mounting the gyroscope, said device including means to produce a signal proportional to the linear velocity of the craft, a device to produce a signal proportional to the sine of the angle of the latitude at which the craft is moving, means to combine said signals so that the resultant is proportional to the linear velocity of the craft and to the sine of the latitude, and means cooperating with said gyroscope and receiving said resultant to provide a correct vertical index.

6. In a gyroscope system for use on a moving craft, a gyroscope, a support mounting said gyroscope for angular movement about mutually perpendicular axes, means for precessing said gyroscope support about each of said mutually perpendicular axes, means responsive to movement of the support relative to the craft about one of said axes and producing a signal which is a function of the angle of tilt of the gyroscope relative to the craft, a computer responsive to the linear velocity of the craft and producing a signal proportional to the linear velocity of the craft, a device to produce a signal proportional to the sine of the angle of the earth's latitude in which the craft is moving, means to combine said two latter signals so that the resultant is proportional to the linear velocity of the craft and to the sine of the earth's latitude, and means to add algebraically said resultant and said first-mentioned signal, and an indicator receiving the sum of said resultant and said first-mentioned signal and showing the true angle of bank of the craft.

7. In a gyroscope system for use on a moving craft, a gyroscope, a support mounting said gyroscope for angular movement about mutually perpendicular axes, means precessing said gyroscope support about each of said mutually perpendicular axes, means responsive to movement of the support relative to the craft about one of said axes and producing a signal which is a function of the angle of tilt of the gyroscope relative to the craft, a computer responsive to the linear velocity of the craft and producing a signal proportional to the linear velocity of the craft, a device to produce a signal proportional to the sine of the angle of the earth's latitude in which the craft is moving, means to combine said two latter signals so that the resultant is proportional to the linear velocity of the craft and to the sine of the earth's latitude, and means to add algebraically said resultant and said first-mentioned signal and to impress the sum on said means for precessing said gyroscope support about one of said axes.

8. In a gyroscope system for use on a moving craft, a gyroscope, a support mounting said gyroscope for angular movement about its bank axis, means responsive to movement of the support about said axis relative to the craft and producing a signal which is a function of the angle of tilt of the gyroscope relative to the craft, means responsive to the linear velocity of the craft for producing a signal proportional thereto, a potentiometer adjustable in proportion to the sine of the angle of the earth's latitude in which the craft is moving and adapted to produce a signal proportional thereto, means to combine said two latter signals so that the resultant is proportional to the linear velocity of the craft and to the sine of the angle of the earth's latitude, and a repeater including an indicator showing the angle of bank of the craft and means to add algebraically the resultant and the first-mentioned signal and to impress the sum on said indicator to show the true angle of bank of the craft.

9. In a gyroscope system for use on a moving craft, a gyroscope, a support mounting said gyroscope for angular movement about its bank axis, means responsive to relative movement of the craft and the support about said axis and producing a signal which is a function of the angle of said relative movement, means responsive to the linear velocity of the craft for producing a signal proportional thereto, a synchro adapted to be rotated through an angle proportional to the sine of the angle of the earth's latitude in which the craft is moving and adapted to produce a signal proportional thereto, means to combine said two latter signals to produce a resultant proportional to the linear velocity of the craft and to the sine of the earth's latitude, and means to add algebraically said resultant and said first-mentioned signal, and an indicator connected thereto to show the true angle of bank of the craft.

10. In a gyroscope system for use on a moving craft, a gyroscope, a support mounting said gyroscope for angular movement about its bank axis, pendulous means for precessing said gyroscope support about said axis, means responsive to rate of turn of the craft to render inoperative said pendulous means on said support when the craft changes direction, means producing a signal which is a function of the angle of tilt of the gyroscope relative to the craft, means to produce a signal proportional to the linear velocity of the craft and to the sine of the angle of latitude in which the craft is moving, and means utilizing said signals to precess the gyroscope support about said axis and to correct for errors caused by angular and linear velocities of the craft and for errors in bank of the craft while the craft changes its direction and to show the true angle of bank of the craft.

11. In a gyroscope system for use on a moving craft, a gyroscope, a support mounting said gyroscope for angular movement about mutually perpendicular axes, a pendulous device, means for precessing the gyroscope support about said axes and responsive to said device, a computer responsive to change in linear velocity and producing a signal proportional to the linear velocity of the craft and rendering inoperative said pendulous device on said precessing means about one of said mutually perpendicular axes when the craft changes velocity, means responsive to movement of the support relative to the craft about the other axis and producing a signal which is a function of the angle of tilt of the gyroscope relative to the craft, means responsive to change in direction of the craft to modify said last-mentioned signal in proportion to the angular velocity of the craft about a vertical axis, means to combine said modified signal and said first-mentioned signal to produce a resultant proportional to the angular and linear velocities of the craft, means receiving said signal which is a function of the angle of tilt of the gyroscope relative to the craft and correcting said signal for improper bank of the craft, and means combining said resultant and the corrected signal and connected electrically to the means for precessing the gyroscope support about the other of said perpendicular axes and impressing the combined signal thereon, means to produce a signal proportional to the sine of the angle of the earth's latitude in which the craft is moving, means to combine said last-mentioned signal with the signal proportional to the linear velocity of the craft so that the result is proportional to the linear velocity of the craft and the sine of the earth's latitude, and means to add algebraically said result and said signal which is a function of the angle of tilt of the gyroscope relative to the craft, and an indicator connected thereto to receive the algebriac sum and to show the true angle of bank of the craft.

12. In a system of the kind described, a gyroscope, a support mounting said gyroscope for angular movement about its bank axis, a synchro responsive to movement of the support relative to the craft about said axis and producing a signal which is a function of the angle of tilt of the gyroscope about said axis relative to the craft, a turn rate gyroscope mechanism including a turn rate gyroscope, a synchro connected electrically to said first-mentioned synchro, and a motor opposing angular displacement of the axis of the turn rate gyroscope, said signal being modified by said turn rate gyroscope mechanism to provide an index for the true rate of turn of the craft about a vertical axis.

HENRY KONET.

REFERENCES CITED

The following references are of record in the file of this patent:

UNITED STATES PATENTS

| Number | Name | Date |
|---|---|---|
| 1,559,688 | Fairchild et al. | Nov. 3, 1925 |
| 1,934,774 | Sperry et al. | Nov. 14, 1933 |
| 2,242,806 | Wunsch | May 20, 1941 |
| 2,411,087 | Ford et al. | Nov. 12, 1946 |
| 2,427,130 | Ford | Sept. 9, 1947 |
| 2,427,158 | Poitras et al. | Sept. 9, 1947 |
| 2,497,614 | Libman | Feb. 14, 1950 |